United States Patent [19]

Zimmerman

[11] Patent Number: 5,509,363
[45] Date of Patent: *Apr. 23, 1996

[54] SEED DRILL GUIDE ASSEMBLY

[76] Inventor: Robert Zimmerman, Box 6, Almira, Wash. 99103

[*] Notice: The term of this patent shall not extend beyond the expiration date of Pat. No. 5,309,852.

[21] Appl. No.: 385,154

[22] Filed: Feb. 7, 1995

Related U.S. Application Data

[63] Continuation-in-part of Ser. No. 173,507, Dec. 22, 1993, Pat. No. 5,461,994, which is a continuation-in-part of Ser. No. 847,784, Mar. 5, 1992, Pat. No. 5,309,852.

[51] Int. Cl.$^6$ .................................................. A01B 35/16
[52] U.S. Cl. .......................... 111/157; 172/172; 172/536; 172/538; 172/731
[58] Field of Search .................................. 111/121, 195, 111/140, 157, 167; 172/536, 538, 172, 177, 765, 770, 771, 731, 721

[56] References Cited

U.S. PATENT DOCUMENTS

| | | |
|---|---|---|
| 1,821,829 | 9/1931 | Coe et al. . |
| 3,077,290 | 2/1963 | Rehder ................................. 111/195 X |
| 3,085,635 | 4/1963 | Livermore ........................... 172/765 X |
| 3,177,830 | 4/1965 | Zimmerman . |
| 3,180,291 | 4/1965 | Loomans ............................. 111/195 X |
| 3,319,590 | 5/1967 | Zimmerman . |
| 3,385,243 | 5/1968 | Zimmerman . |
| 3,923,104 | 12/1975 | Tibbs ................................... 172/765 X |
| 4,461,355 | 7/1984 | Peterson et al. ..................... 111/140 X |
| 4,671,193 | 6/1987 | States ................................... 111/195 X |
| 4,691,645 | 9/1987 | Anderson ............................. 111/195 X |
| 4,844,174 | 7/1989 | Zimmerman .......................... 172/538 |
| 5,309,852 | 5/1994 | Zimmerman ........................... 111/121 |

OTHER PUBLICATIONS

Yetter Mfg. advertisement–*Farm Journal*, Mid–Jan. 1992.
"Superseeders" brochure, John Deere (1990)–9000 Series Press–Wheel Drills, pp. 20–27.

*Primary Examiner*—Eric K. Nicholson
*Assistant Examiner*—Christopher J. Novosad
*Attorney, Agent, or Firm*—Wells, St. John, Roberts, Gregory & Matkin

[57] ABSTRACT

A seed drill includes a novel planting assembly combining press wheels for packing angular sides of a furrow and a runner immediately behind and longitudinally aligned with the press wheel. The runner extends rearwardly from beneath the press wheel at the lower end of an arcuate shank that is transversely guided on the press wheel structure or frame of the drill to maintain it in longitudinal alignment within an open longitudinal slot cut through the soil and intersecting the base of the packed furrow. The shank is guided by a series of rollers within a guide frame pivotally mounted on a supporting frame for motion about a transverse horizontal axis. Highly accurate planting depth control can be achieved, with provision for upward relative movement of the runner as required by encountered field conditions.

32 Claims, 13 Drawing Sheets

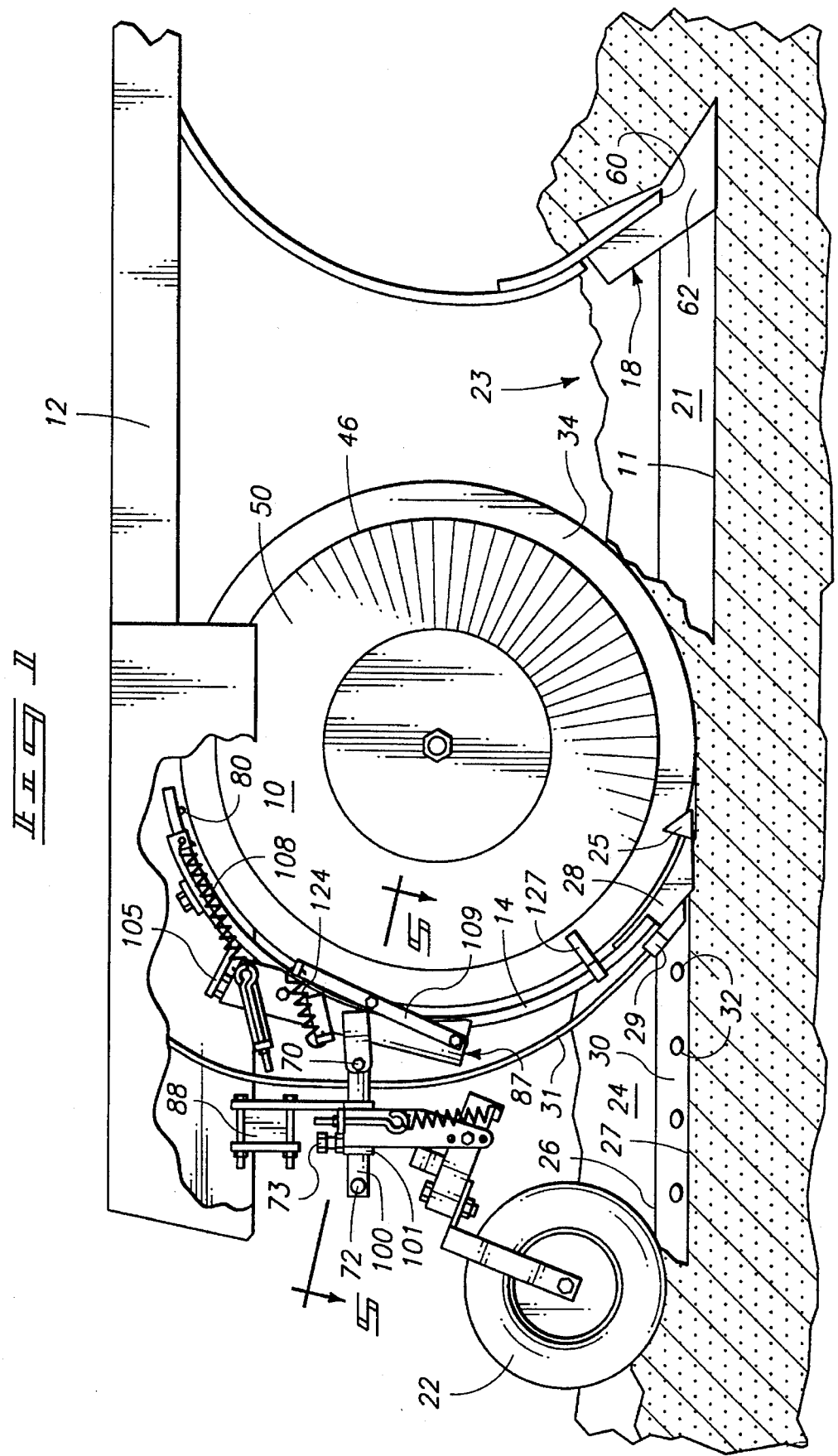

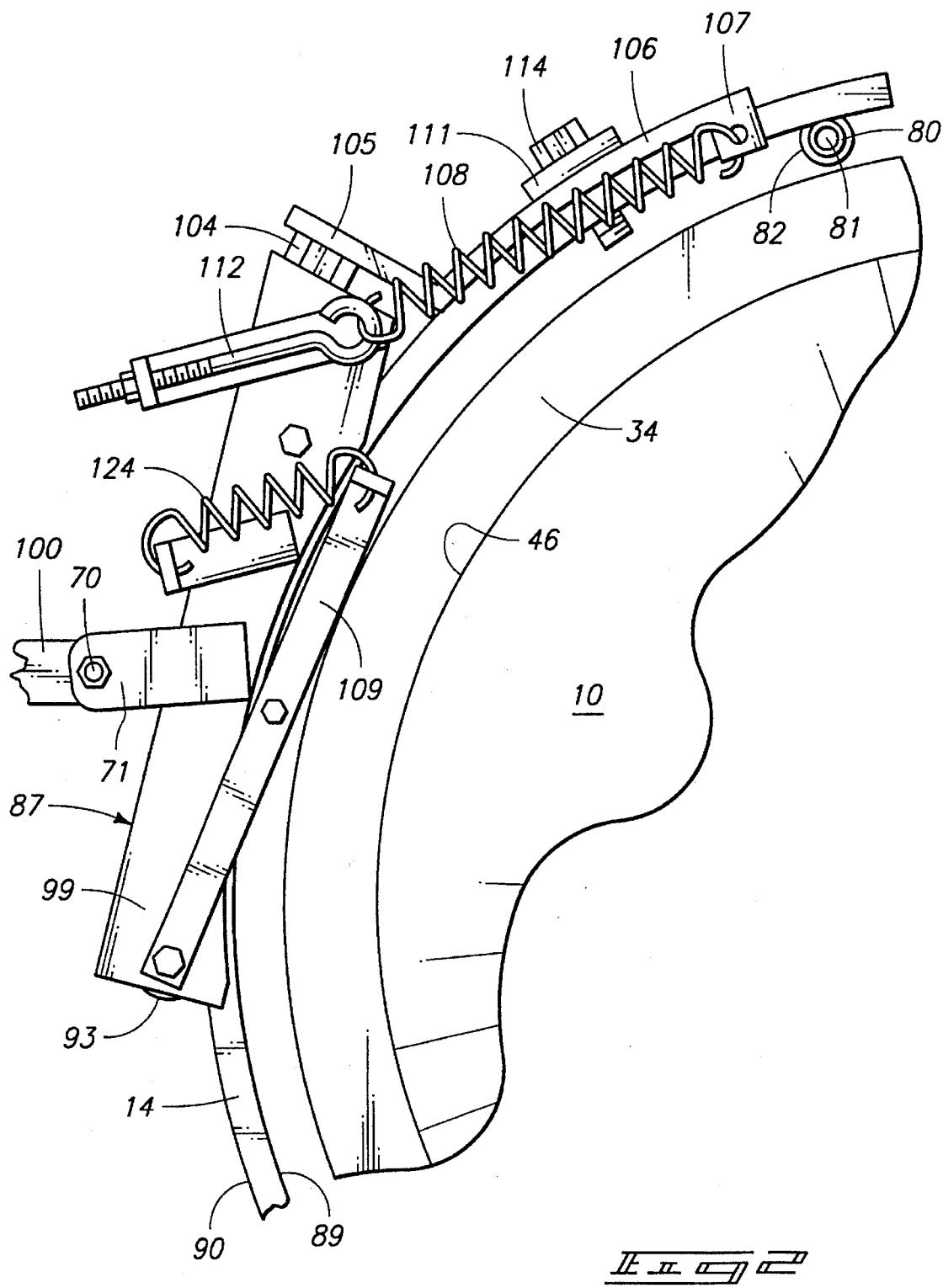

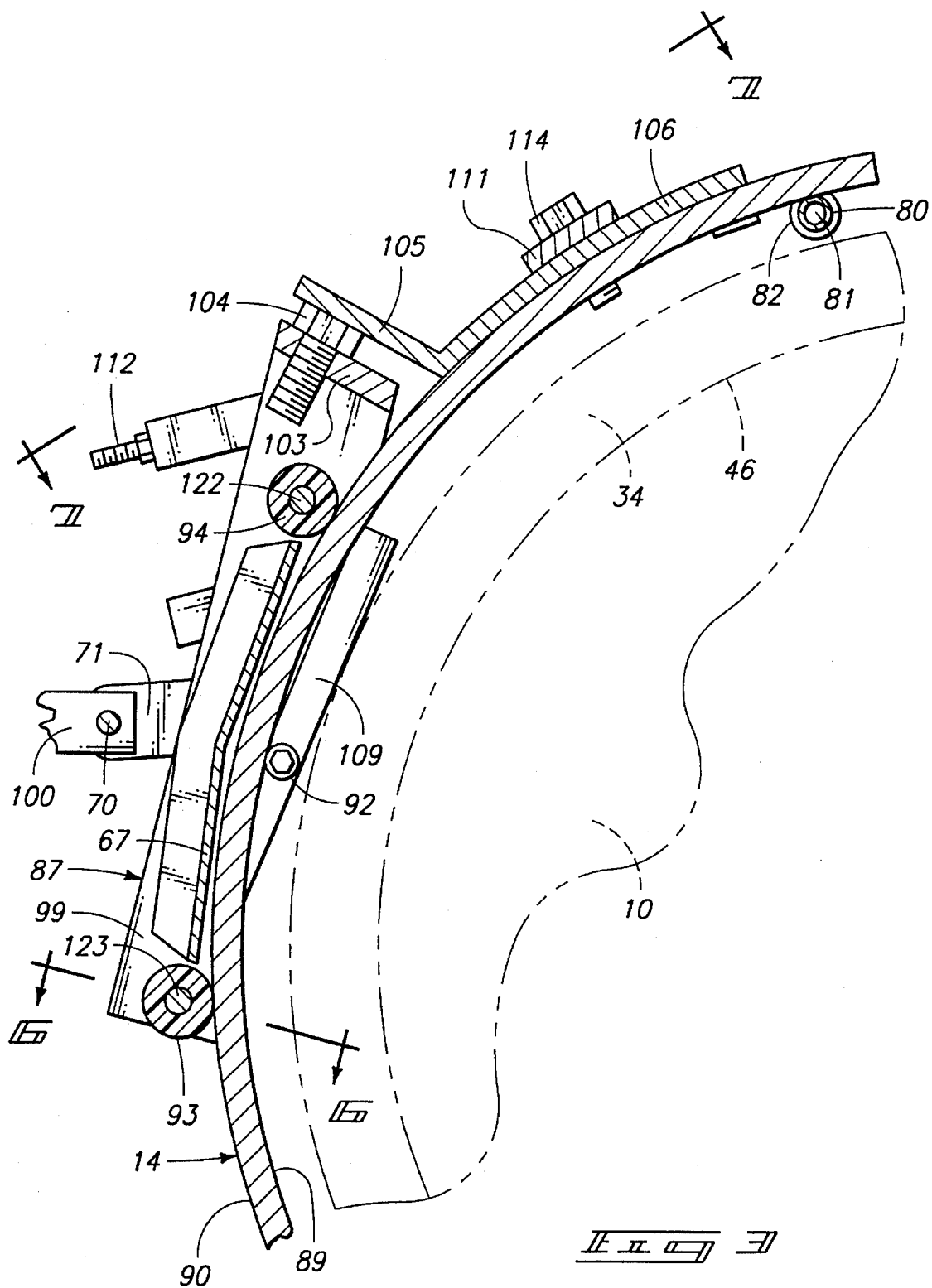

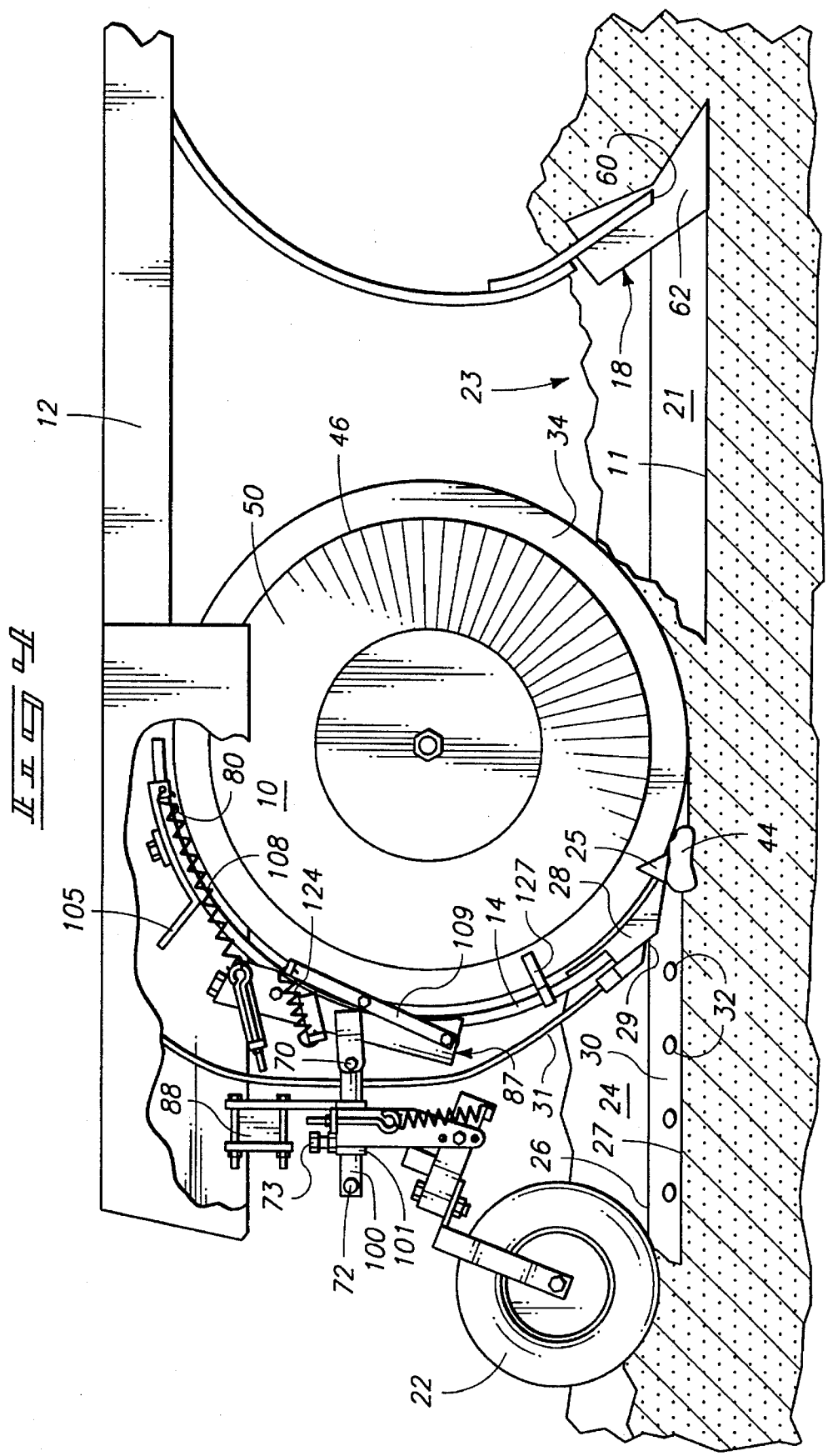

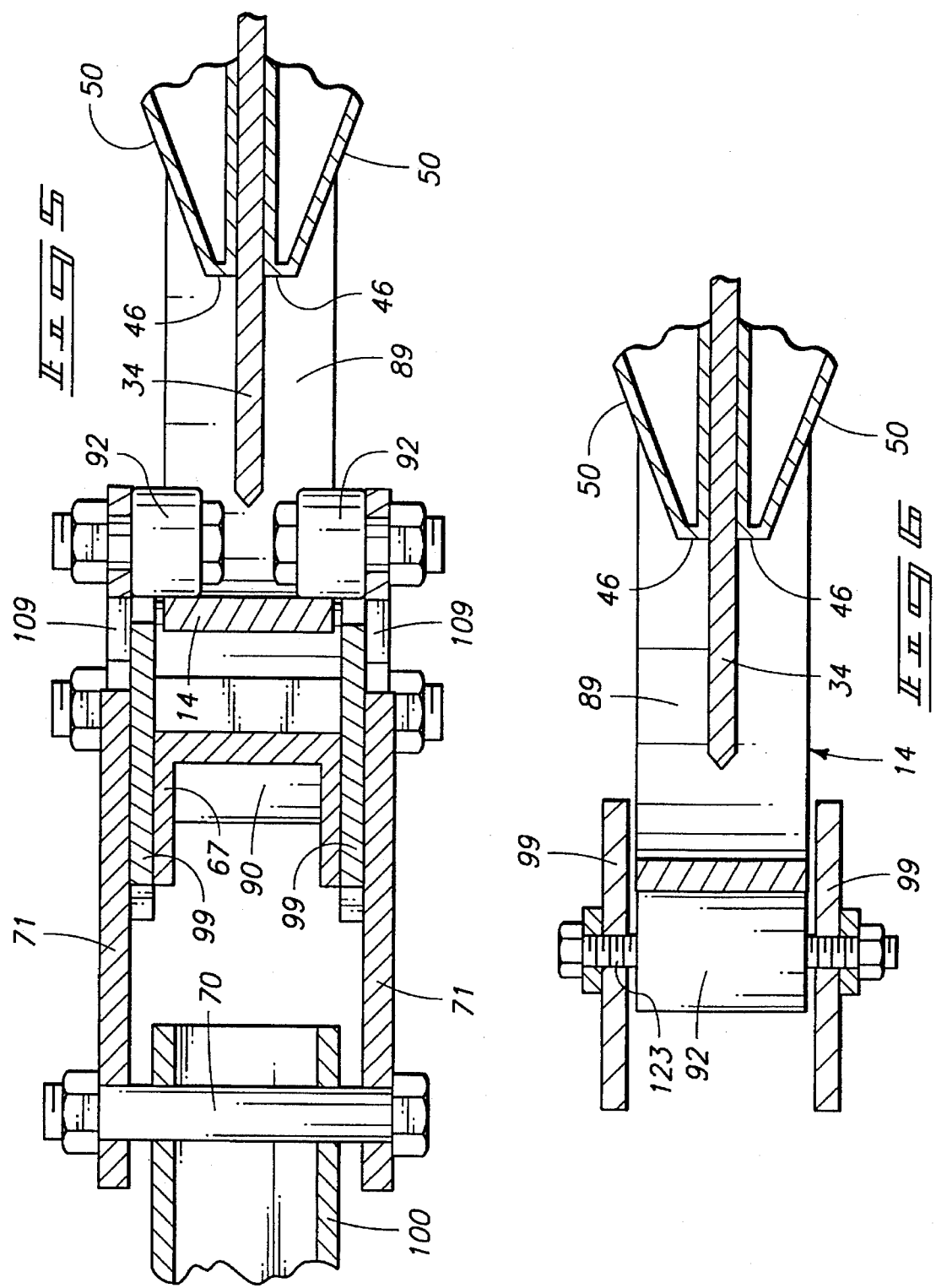

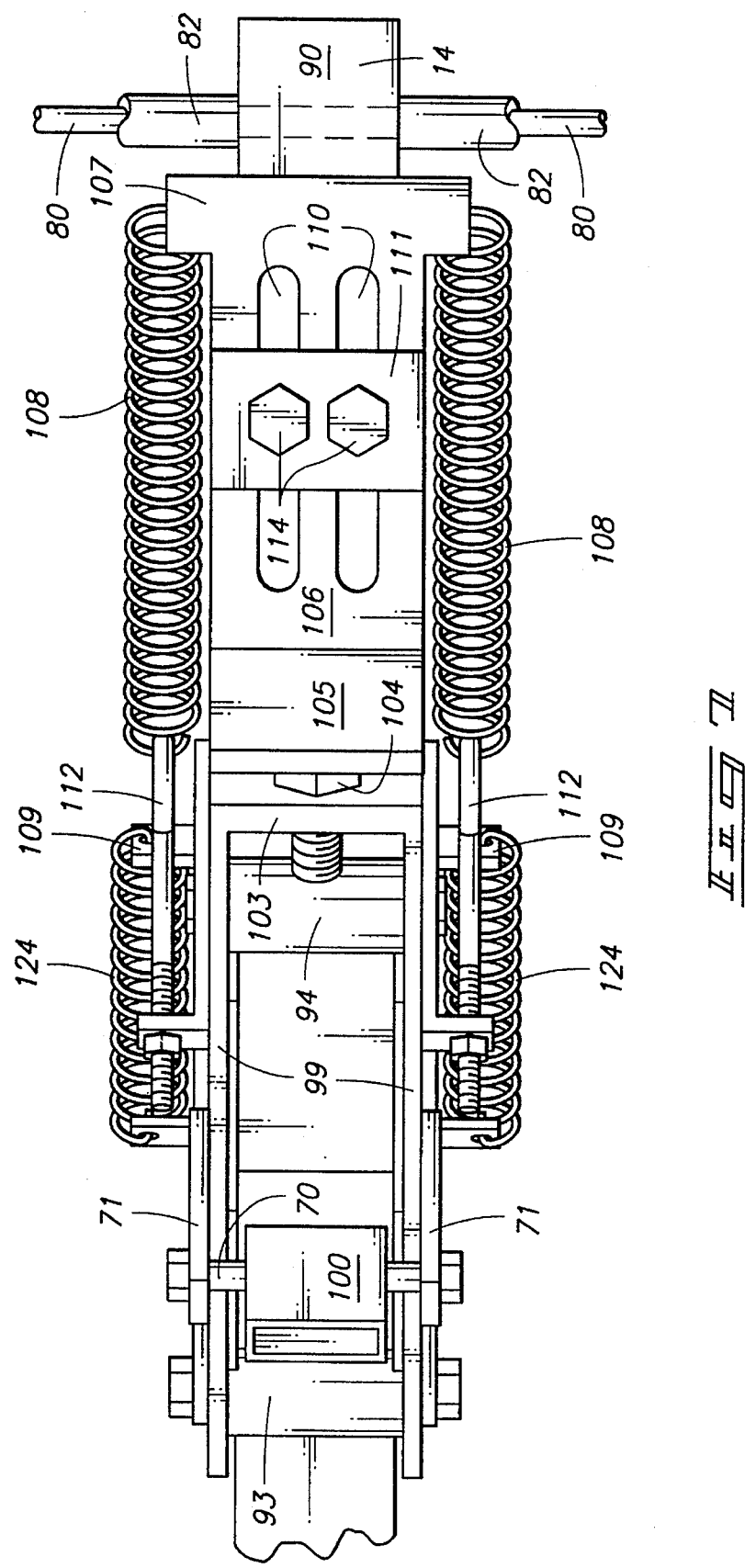

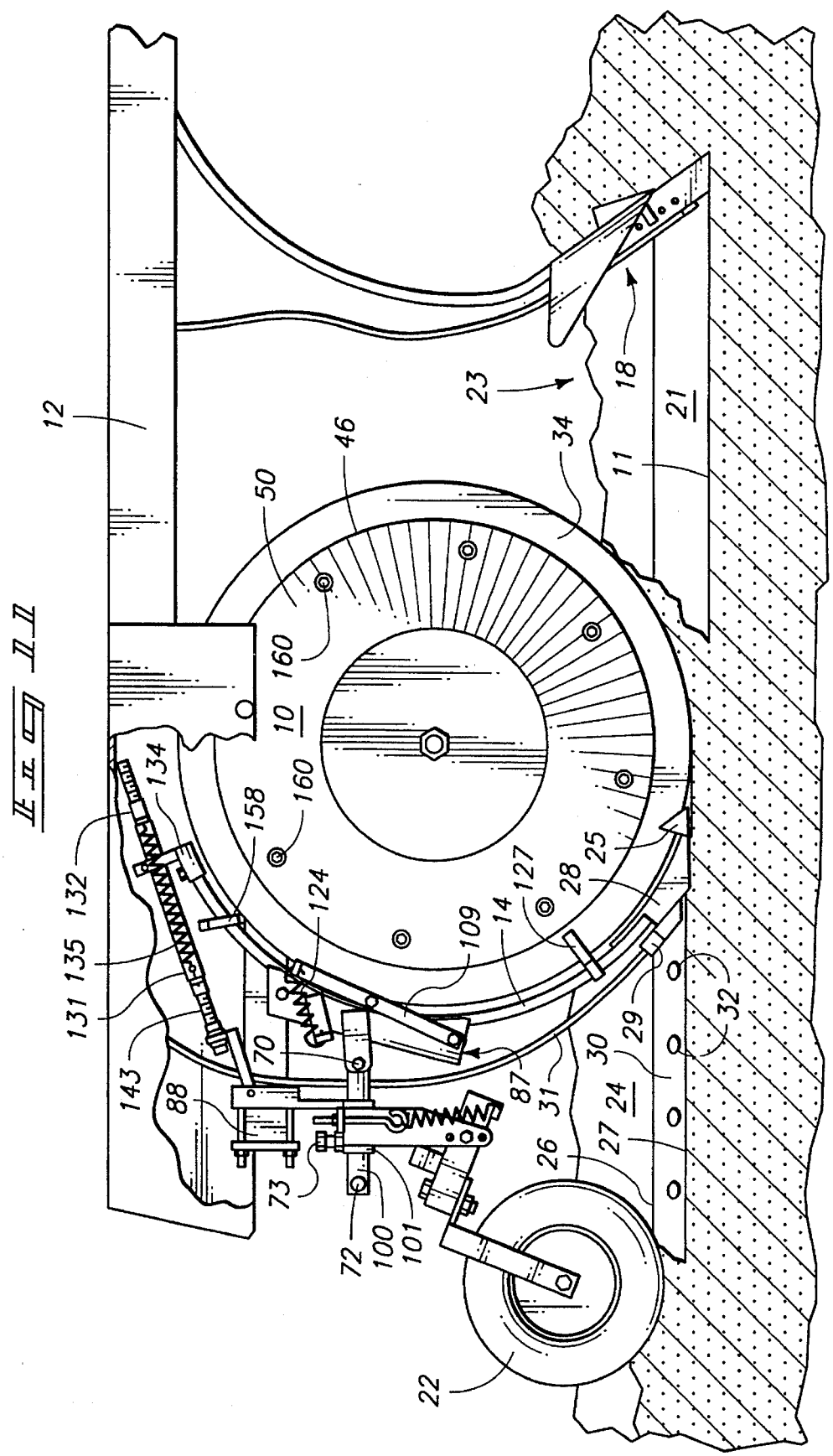

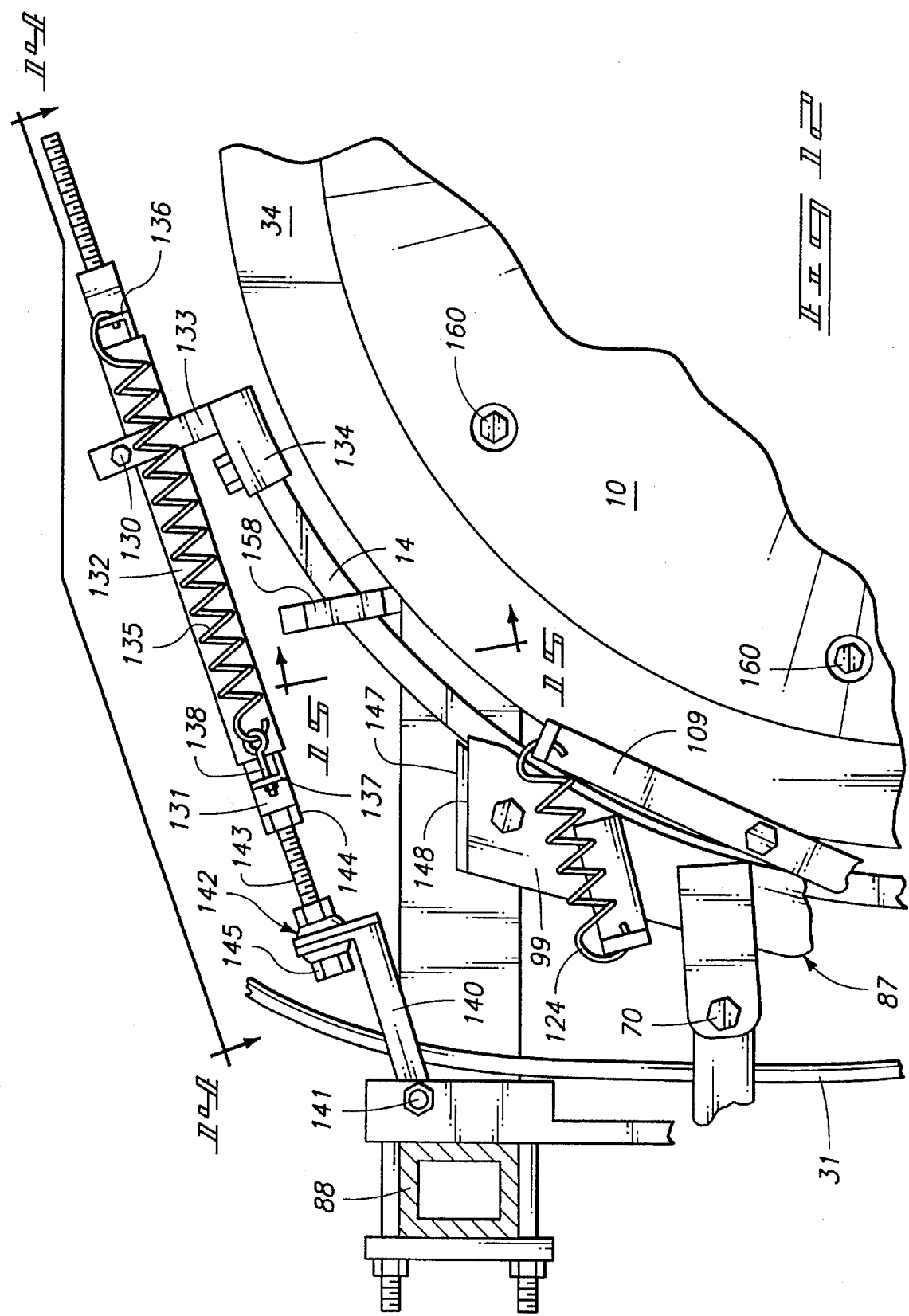

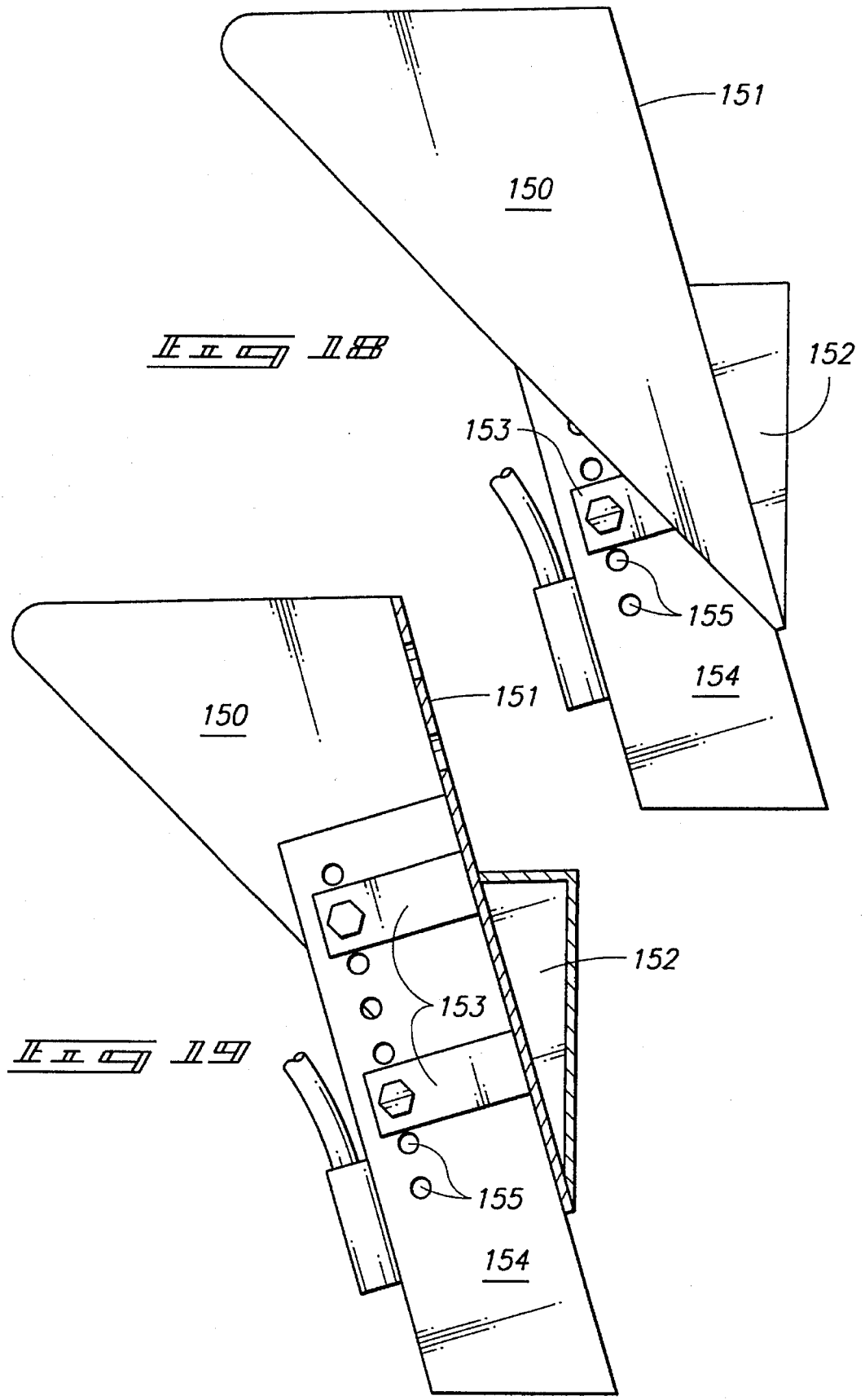

SEED DRILL GUIDE ASSEMBLY

RELATED APPLICATION

This is a continuation-in-part of pending U.S. patent application Ser. No. 173,507, filed on Dec. 22, 1993 and titled Seed Drill Planting Assembly", now U.S. Pat. No. 5,461,994, which in turn is a continuation-in-part of U.S. patent application Ser. No. 847,748, filed on Mar. 5, 1992 and titled "Seed Drill", now U.S. Pat. No. 5,309,852.

TECHNICAL FIELD

This disclosure pertains to seed drills for planting crops such as grains. It specifically relates to improvements in placement of seeds in soil within an open longitudinal slot of a preset depth.

BACKGROUND OF THE INVENTION

This invention relates to improvements in a seed drill of the type generally disclosed in my U.S. Pat. No. 3,177,830, which was issued on Apr. 13, 1965. Modifications of this type of seed drill are disclosed in my U.S. Pat. Nos. 3,319,590, issued May 16, 1967, 3,177,830, issued Apr. 13, 1965, 3,385,243, issued May 28, 1968 and 4,844,174, issued Jul. 4, 1989. The disclosures of my four prior patents are hereby incorporated within this disclosure by reference.

The seed drills described in my referenced U.S. patents are designed for deep furrow seeding of crops. Seed is planted at the bottom of a furrow having packed sloping sides. This is accomplished by placing the seed into the slotted soil behind a shovel forward of and followed closely by press wheels that pack the sides of the open furrow. The press wheels pack the sloping sides of the furrow after seed placement in an attempt to assure accurate control of both planting depth and proper soil coverage over the seeds.

The above-referenced inventions were developed primarily for use in soil conditions where subsurface moist soil was covered by a substantial layer of dry loose soil. Such conditions are prevalent in the northwestern United States where winter wheat is grown by dry land farming techniques. While the referenced inventions have been widely adopted and have been proven to enhance seed germination and resulting crop yields when used, it is recognized that substantial variations in planting conditions continue to exist even where such improvements are used. This can be attributed to the natural variations that occur in the subsurface elevation of the moist soil and to surface undulations encountered where fields are not perfectly flat.

Under normal conditions, such planting equipment must be preset to place seed at an average depth that will normally locate it in moist soil. However, where the soil moisture line is below the average elevation for a field or where the equipment must span a slight dip in the soil contour, the planting equipment will place seeds in drier soil than is desirable. Such soil is very unstable and likely to slough downwardly to partially fill the furrow above the seed. When this occurs, expected growth from the germinating seed will be disrupted by the unwanted soil cover. This is particularly detrimental if there has been an intervening rain that forms a crust in the covering soil through which the emerging plant growth must penetrate.

Many of the problems of prior art drills, which usually required staggered placement of seed openers across the drills, were solved when an in-line version of the drill shown in U.S. Pat. No. 3,319,590 was commercially introduced. In these drills, a seed placement boot was overlapped within the following press wheels. The furrow opener was relatively narrow and could be effectively pulled through the field in a transverse straight line relationship of the shovel openers and press wheels.

This drill became very popular in summer-fallow areas. However, it was not without problems. It could not travel through much trash or straw when a furrow deeper than four inches was required to reach moist soil. In some of the drier areas, users were forced to revert back to staggered drills.

Later development of notched pressed wheels (U.S. Pat. No. 4,844,174) gave the in-line drills much better trash clearing capabilities, but the drills still encountered problems where five to six inches of dry soil was encountered. Under these drier conditions the pointed opener had to be able to retract rearwardly into the press wheels to clear field obstacles. It was physically impossible to design an opener of this design which could lift sufficient moist soil to form a covering over the sides of the furrows and hold the packed furrows open after seeding. In many situations three to four inches of dry soil would fall back over planted seed in the resulting deep furrows.

An ideal drill should produce a planting furrow, whether shallow or deep, with no dry dirt located over the seeds. It should be applicable to no-till seeding methods, as well as to conventional tilling techniques. Grain seeds should be positioned approximately one to two inches deep within packed moist soil with very consistent accuracy. Other types of seeds should be planted very accurately at depths ranging between one-fourth to one-half inch or even less.

Recognized shortcomings in the planting accuracy of the drills described in my prior patents have led me to the discovery of a new relationship between the planting runner for placement of seeds and the press wheels that pack the furrow sides as disclosed herein. With this new drill, because of the relative locations of the component parts in a planting sequence, each operation carried out by these component parts contributes to formation of a perfect furrow and accurate seed placement. Seed is planted in a carefully defined slot after furrow formation and packing has been completed. No uncontrolled seed coverage can occur in the packed furrow. When planting in moist soil conditions, no furrow formation is required. Use of this accurate seed placement equipment will result in substantially higher yields and eliminate or minimize the necessity of reseeding, regardless of weather encountered after the seeding sequence has been carried out.

BRIEF DESCRIPTION OF THE DRAWINGS

Preferred embodiments of the invention are described below with reference to the accompanying drawings, which are briefly described below.

FIG. 1 is a fragmentary side elevation view of the seed drill illustrating planting of seed under normal field conditions;

FIG. 2 is an enlarged fragmentary side view of the shank and guide frame as seen in FIG. 1;

FIG. 3 is an enlarged fragmentary side view showing the shank and guiding rollers, the adjacent press wheels and coulter being shown in dashed lines;

FIG. 4 is a view similar to FIG. 1, showing a raised position of the runner;

FIG. 5 is an enlarged fragmentary sectional view taken along line 5—5 in FIG. 1;

FIG. 6 is a fragmentary sectional view taken along line 6—6 in FIG. 2;

FIG. 7 is a top view showing the upper end of the shank as seen along line 7—7 in FIG. 2;

FIG. 11 is a view similar to FIG. 1, showing a modified arrangement for supporting the arcuate shank;

FIG. 12 is an enlarged elevation view of the modification shown in FIG. 11;

FIG. 13 is a vertical sectional view taken through the modification shown in FIG. 13;

FIG. 18 is a side view; and

FIG. 19 is a sectional view taken along line 19—19 in FIG. 17.

DETAILED DESCRIPTION OF THE PREFERRED EMBODIMENTS

Figure 8:
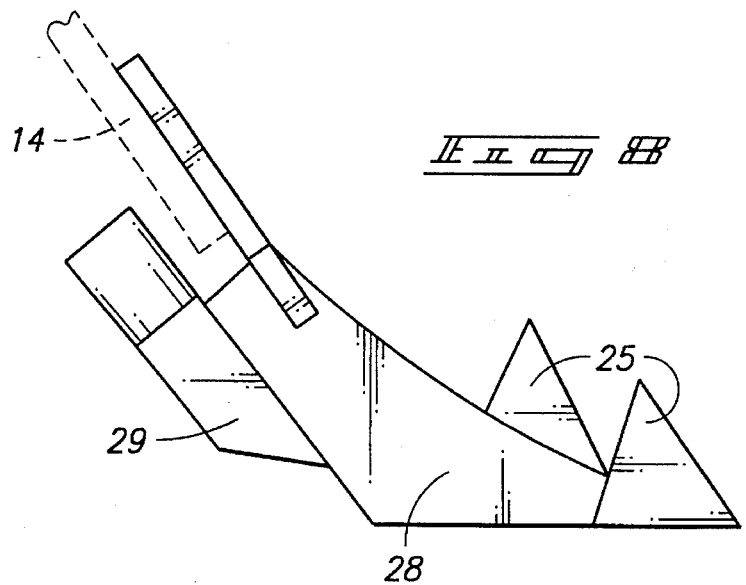
FIG. 8 is a side view of an improved runner structure.

This disclosure of the invention is submitted in furtherance of the constitutional purposes of the U.S. Patent Laws "to promote the progress of science and useful arts" (Article 1, Section 8).

Details of a first embodiment of a planting assembly for a seed drill are shown in FIGS. 1–9. A second and preferred embodiment of the planting assembly is shown in FIGS. 10–19. In both forms of the invention, a runner that forms a seed-receiving slot is guided on a projecting circular coulter that is part of an associated wheel assembly.

These improved embodiments of the seed drill planting assembly disclosed in U.S. Pat. No. 5,309,852 have been developed primarily for planting grains in dry field conditions where a moist subsurface is covered by a surface layer of dry loose soil. However, the practical field applications of the seed drill planting assembly are not limited to such conditions. It can also be used for planting seed at more shallow depths in moist surface soil conditions where formation of deep furrows is not required. It is also applicable to no-till applications and without furrow formation, where seed is planted in a field containing stubble from a prior crop without cultivation of the field prior to seeding; as well as in minimum-till situations where prior field cultivation is limited and relatively shallow in depth.

The seed drill as shown in the accompanying drawings is specifically designed to utilize a multi-stage development of packed furrows, although the principles of this seed drill can be utilized without the formation of furrows. The furrows are typically first cut by passage of an opener, such as a double disk coulter or shovel. The lowermost portion of the furrow produced by the opener should form a longitudinal slot below the intended base of the packed furrow.

The sides of the furrow are next packed in oppositely sloping configurations by the rolling pressure of opposed press wheel surfaces that define the furrow side slopes. After the furrow sides have been packed, the slot at its base is temporarily filled. Immediate passage of a narrow vertical runner guided transversely between the press wheels reshapes an open seed-receiving slot extending beneath and behind the press wheels.

Seed is dropped into the open slot in longitudinal alignment with the runner that shapes it. The slot is subsequently closed by passage of a packing wheel. Moist soil is firmed around the seed as the slot is closed, insuring effective seed germination.

The seed drill planting assembly basically comprises a wheel assembly rotatably mounted about a horizontal transverse axis for rolling soil engagement in a forward direction along a field. A supporting shank is located in a transversely centered upright position behind the wheel assembly. A narrow longitudinal runner is mounted to a lower end of the shank, the runner being centered across the width of the wheel assembly and extending rearwardly from beneath the wheel assembly. Guiding elements are located in engagement with the shank for permitting movement of the shank and runner along an upright arcuate path substantially centered about the transverse axis of the wheel assembly. Seed delivery means is provided on the runner for depositing seeds at a location immediately behind the runner.

General details of the first illustrated embodiment of the seed drill and planting assembly are best illustrated by reference to FIG. 1. It is developed about paired press wheels 10 rotatably mounted about a transverse axis on a supporting vehicle frame 12. The paired press wheels 10 have tapered or conical surfaces 50 leading to a rim 46. The surfaces 50 are capable of packing the sloping sides of a longitudinal furrow as they roll through it. The illustrated sloping sides 24 of the packed furrow lead downwardly to a furrow base 26.

While conical press wheels are illustrated in conjunction with all of the embodiments of this invention, it is to be understood that the supporting press wheel assemblies associated with the seed drill planting assembly might be substantially cylindrical where formation of a furrow is unnecessary for planting purposes. This is particularly true in no-till planting operations, and where seeds are to be planted at very shallow depths within a field.

A narrow upright runner 28 extends rearwardly from beneath the paired press wheels 10. Runner 28 is transversely guided on the paired press wheels 10 to maintain it in longitudinal alignment within an open longitudinal slot 30 that intersects the packed furrow base 26. Delivery means is provided for dropping seeds 32 into slot 30. Runner 28 includes a front point 25 positioned closely adjacent to the periphery of a coulter 34 positioned between the paired press wheels 10.

The seeds 32 are deposited within open slot 30 immediately behind the runner 28. The seed-receiving slot extends vertically between the furrow base 26 intersected by it and a bottom slot surface 27 on which the delivered seeds 32 are supported.

Runner 28 is elevationally supported at the lower end of an upright shank 14 movably mounted relative to frame 12. The shank 14 is transversely centered behind a circumferential coulter 34 that rolls in unison between the paired press wheels 10. The primary purpose of the illustrated coulter 34 is to either cut or reestablish a seed-receiving slot along the base of the packed furrow. A secondary benefit is its inherent resistance to side slippage of the seed drill when operated along hillsides.

Runner 28 is mounted for angular movement along an arc centered about the transverse axis of the paired press wheels 10.

The press wheels 10 comprise a pair of oppositely facing press wheel elements. The two opposed elements can be separately formed or fabricated as an integral unit. Each has a circular rim 46 centered about a press wheel transverse axis. Each also includes a coaxial circular wall 48 that is perpendicular to the transverse axis and is offset from rim 46 in a direction parallel to the transverse axis. The diameter of the circular wall 48 is less than the diameter of rim 46. Circular wall 48 can be planar or can be inwardly dished.

A coaxial conical wall 50 completes the basic structure of each press wheel element. It joins the rim 46 and circular wall 48. The conical wall 50 is inclined outwardly from the rim 46 (see FIG. 7).

The press wheel elements, when formed separately, will also normally include an inner circular wall 49 that is also perpendicular to its transverse axis and is transversely spaced from wall 48 to complete a hollow enclosed wheel structure. However, wall 49 is not vital to the operative exterior surfaces of the press wheels 10 and can be omitted or modified in the case of integrally formed press wheels.

The press wheels shown in the drawings are designed for deep furrow seeding, along furrows that typically have depths greater than two inches below the field surface. Examples of deep furrows include furrows having depths of three to six inches, or even more. When used for no-till field applications and for planting seeds in shallow furrows or in shallow slots without furrows, the widths of the conical walls 50 across the press wheels 10 can be substantially decreased or eliminated entirely, thereby permitting the row spacings to be decreased as well.

The periphery of each illustrated press wheel has a continuous and uninterrupted circular configuration. However, it is to be understood that the press wheel periphery configuration can be interrupted by open recesses of the type taught in my U.S. Pat. No. 4,844,174 where the benefits of such recesses are desired by a user.

The circumferential coulter 34 that projects radially outward from between the rolling press wheel elements cuts the vertical slot 30 as it rolls between the packed sloped sides 24 of a furrow. Coulter 34 is perpendicular to and coaxially centered about the transverse axis of the press wheels 10. The rims 46 of the press wheel elements lead inwardly to the coulter 34, which is abutted by them. The outside diameter of coulter 34 is greater than the outside diameter of the abutting rims 46.

Coulter 34 can be formed as a separable circular disk or as an annular element joined between opposed press wheel elements. It also might be fabricated integrally with the associated press wheels 10 as a unitary rolling member. Coulter 34 rotates in unison with a pair of separately fabricated press wheels 10 about a common central axis. The outer periphery of coulter 34 is preferably sharpened to assist in penetrating moist soil through which it rolls during formation of the planting slot 30.

Separately formed press wheels 10 and a coulter 34 can be assembled in abutting positions on a common supporting axle and held against one another by their mounting attachments to the axle, as shown generally in FIGS. 1 and 4. However, to better guard against soil being forced between the separately formed elements, they can be joined by a series of bolts 160 arranged radially outward from the axle, as shown in FIG. 11.

Runner 28 maintains slot 30 in an opened condition and refines the slot configuration as it slidably moves within the open slot 30, thereby physically preventing soil from falling within the slot confines until seeds 32 have been dropped within it. Runner 28 is located at the lower end of the shank 14 to maintain the runner 14 in longitudinal alignment within the slot 30 cut through the soil by rolling engagement of coulter 34.

Runner 28 can be separably fabricated and releasably joined to the lower end of shank 14 as shown in the accompanying drawings. The forward end of runner 28 is positioned immediately adjacent to the periphery of the coulter 34 and is pointed to complement the shape of coulter 34 and minimize any gap between them.

Seed is delivered from a conventional storage box and a seed metering assembly (not shown) of conventional design that supply a controlled volume of seeds to a flexible seed delivery tube 31. The lower end of the seed delivery tube 31 directs the seeds into a vertical opening in a seed-receiving bracket 29 rearwardly adjacent to the back edge of runner 28. Thus, individual seeds can drop freely through the opening and are deposited immediately behind the moving runner 28.

The purpose of runner 28 is normally not to open the slot at the base of the furrow, which is accomplished by the action of coulter 34. Its purpose is to refine the configuration of the slot and to maintain it in an open and carefully defined shape for accurate seed placement at a preselected depth behind the runner.

The planted seeds are covered within slot 30 by subsequent rolling passage of a packing wheel 22 that trails behind the supporting shank 16. The packing wheel assembly is typically spring-biased to apply covering pressure to soil above the planted seeds. The structure and operation of such packing wheels is well known in seed drill technology. Further details concerning this element are not believed to be necessary for an understanding of the present improvements.

While the rolling action of press wheels 10 and coulter 34 alone might be used in a "no-till" seeding procedure where seeding is accomplished under relatively shallow conditions, in most instances the described planting assembly will be used in conjunction with a longitudinally aligned opener, such as the illustrated shovel 18 or a conventional coulter assembly (not shown).

Furrow formation and seed deposition can best be understood from a study of FIG. 1. The initial furrow is produced by passage of a shovel 18 or some other form of conventional opener, such as a double disk coulter. Shovel 18 forms a rough open furrow 23 whose sides are covered by loose moist soil. An extended slot 21, produced by action of a depending vertical shovel blade 62, extends vertically from the furrow base (defined by passage of lower edge 60 on the transverse shovel 18) and a slot bottom surface 11. If the rough furrow 23 is formed by a double disk coulter or other opener, the cut soil might extend in a continuous slot from the field surface to the elevation indicated in FIG. 1 by the reference numeral 11.

The subsequent rolling action of press wheels 10 will pack the furrow sides 24, if any, in a predefined sloping configuration. The sides will be firmed in a shape-retaining manner because of a covering of moist soil provided by action of the shovel 18. The rolling pressure of press wheels 10 will also close the slot 21. The slot is then partially reestablished by the cutting action of rolling coulter 34.

The side walls of the newly reestablished slot are partially disrupted by initial passage of runner 28. This tends to fill the slot, except where it is slot is formed again about the downwardly projecting structure of runner 28. Sliding passage of runner 28 subsequently smooths the sides and bottom surface 27 of the side-receiving slot that is open immediately behind runner 28.

In operation, as illustrated in FIGS. 1 and 4, the shovel 18, press wheels 10, coulter 34, shank 14 and runner 28 act cooperatively to assure highly accurate depth placement of seeds 32 at the base of the packed furrow.

The close proximity of runner 28 to the perimeter of coulter 34 substantially prevents any soil from falling into that portion of the slot filled by the runner 28 until passage of the runner has been completed. Seed is dropped immediately behind runner 28 and is accurately deposited at the selected depth within the open slot 30 prior to being covered by passage of packing wheel 22, which rolls along the base 26 of the furrow.

Because soil conditions vary about a field, the actual elevation of runner 28 can change slightly as more or less soil resistance is encountered by the runner 28. Shank 14 is free to move upwardly about an arc that is substantially centered about the transverse press wheel axis to maintain even pressure against the subsoil structure. This amount of movement is relatively slight, and is shown to an exaggerated degree in FIG. 4.

When a subsoil obstacle, such as a rock 44 (FIG. 4) is encountered, the shank 14 and runner 28 are free to move both upwardly and rearwardly as required to clear it. The rearward force against the rock 44 would otherwise cause structural damage to the seeding assembly components. As soon as the obstacle has been overcome, biasing springs 108 operably connected to the shank 14 will return it to its normal working position.

It is important to note the accurate longitudinal alignment of the various components. The shovel blade 62, the vertical coulter 34 and the runner 28 are at all times in longitudinal alignment with one another. It is important that this critical alignment of runner 28 and coulter 34 cannot be displaced by turning forces or other resistance encountered in the soil being worked. The result of this alignment is not only careful preparation of the seed-receiving slot, but also accurate seed placement within the slot at the rear of runner 28.

The described components lend themselves readily to placement of fertilizer at the back of the shovel blade 62. In addition, the mechanical disturbance of soil to an elevation below the seed planting depth tends to aerate the soil, which seems to destroy some of the organisms damaging to germinating plants.

It is to be understood that the described planting assemblies are to be used in multiple positions across a seed drill for simultaneously seeding a plurality of rows. While the runners 28 will normally be set at a common elevation relative to the supporting framework of a seed drill, the described support system for the individual runners 28 will permit them to be individually adjusted if necessary. For instance, a runner 28 lined with vehicle wheel marks in the field might be elevationally set at a height slightly different from the height of adjacent runners engaging soil that is not packed.

In FIGS. 1–7, the runner and shank are primarily carried on the supporting frame 12 of the seed drill. Auxiliary lateral guidance for the runner and shank is provided by engagement of the side surfaces about circular coulter 34.

Shank 14 is preferably constructed from a rigid bar of spring steel or other suitable structural material capable of maintaining its arcuate shape without deflection under the loads imparted to it in this application. Bending such metal elements is not entirely accurate. Therefore, it is important to support and guide the shank 28 in a manner that can accommodate variations in its surface and curvature.

The arcuate shank 14 is located in a transversely centered upright position behind the press wheel assembly. It has a rectangular cross-sectional configuration, with front and rear surfaces 89, 90. The surfaces 89, 90 each has a curvature that is substantially concentric about the press wheel axis. The respective curvatures of surfaces 89 and 90 complement the curvature of the circular periphery of coulter 34. The side edges of the shank 14 are parallel to one another and to the side surfaces of coulter 34.

Runner 28 extends rearwardly from beneath the press wheel assembly in the manner previously described. In the preferred placement of the runner 28 and shank 14, the front surface of the narrow runner 28 is closely adjacent to the periphery of coulter 34. The front surface 89 along the shank 14 should also be adjacent to the coulter, but is slightly spaced rearwardly from its periphery. The forward point of runner 28 should extend slightly beneath coulter 34 and press wheels 10, as previously discussed and as illustrated in the drawings.

The arcuate shank 28 is guided for elevational movement within a supporting upright guide frame 87 which is pivotally supported on a transverse tool bar 88 on the seed drill frame 12. Guide frame 87 comprises a pair of identical parallel side plates 99 rigidly joined by an elongated wall 67 and an upper transverse plate 103 (see FIG. 3).

Opposing rollers are provided on the guide frame 87 in engagement with the front and rear surfaces 89 and 90 of shank 14 for permitting elevational movement of the shank 14 and runner 28 along an upright arcuate path substantially centered about the transverse axis of press wheels 10. At least three rollers 92, 93 and 94 are respectively spaced along the guide frame 87, with alternate rollers engaging the opposed front and rear surfaces 89 and 90 of the shank 14.

The positions of rollers 92, 93 and 94 on the supporting guide frame 87 assist in defining the desired arcuate path of shank 14 relative to guide frame 87 and press wheels 10. In practice, it is desirable that rollers 92, 93 and 94 be positioned to locate the arcuate front surface of runner 28 as close to the periphery of coulter 84 as is practical. This prevents straw and other field trash from becoming entangled between them. Any such material will be sheared by the rotational motion of the coulter 34 relative to the arcuate front surface of runner 28.

At least one of the rollers 92, 93 and 94 is movably supported relative to the guide frame 87. As shown in the drawings, this function is provided by the front roller 92.

The front roller 92 that engages the front surface 89 of the shank 14 is illustrated as a split roller assembly. It includes two narrow rollers transversely spaced at opposite sides of coulter 34 (see FIG. 5). The two narrow rollers are coaxial and individually mounted on stub shafts carried on front roller brackets 109 pivotally mounted adjacent the side plates 99 about a common support shaft 123.

The outer ends of brackets 109 are connected to tension springs anchored to bent brackets on the respective side plates 99. Springs 124 operably connect the front or center roller 92 to the guide frame 87 for yieldably urging the roller toward the arcuate path of the shank 14 relative to the guide frame 87. The individually biased rollers at each side of surface 89 also accommodates any encountered twisting of shank 14 during seeding operations.

The arcuate path of shank 14 along the guide frame 28 is defined by the rear rollers 93 and 94 that roll against the rear surface 90 of shank 14. Roller 93 is rotatably mounted about the previously-described transverse shaft 123 fixed across the side plates 99. Roller 94 is similarly mounted for rotation about a transverse shaft 122.

The tension applied to the front roller 92 by the springs 124 varies the rolling pressure exerted on the front and rear surfaces 89, 90 of shank 14 by the three guiding rollers 92, 93 and 94. The spring pressure should be selected to permit free rolling engagement between the rollers and shank. The yieldable ability of roller 92 accommodates any practical variations in the arcuate shape or surface qualities of the bent rigid bar that comprises the shank 14.

A transverse shaft 70 pivotally connects the guide frame 87 to the supporting vehicle frame for motion about a horizontal transverse axis. The shaft 70 is fixed across guide frame 87 between rearwardly projecting extensions 71. Shaft 70 is shown as a conventional bolt fastened across the extensions 71. The guide frame 87 is supported on shaft 70 by means of a rearwardly projecting mounting bar 100 through which the shaft 70 is slidably extended. The transverse width of mounting bar 100 is substantially less than the interior spacing between the side plates 99. Guide frame 87 can therefore freely move in transverse directions along the axis of shaft 70 as required to center the guide frame 87 and shank 14 relative to the guiding press wheel assembly.

The rearward end of mounting bar 100 is slidably supported within a socket 101 on the supporting tool bar 88. It can be adjusted in a direction parallel to its length to properly locate the guide frame 87 and shank 14 relative to the guiding press wheel assembly. Mounting bar 100 is then locked at the desired position by a locking bolt 73 threadably engaging it through the socket 101. Its forward motion is limited by an extended transverse rod 72 fixed across its rearward end.

The upper end of shank 14 is provided with at least one spring operably connected between it and the guide frame 87 for yieldably urging the shank 14 downwardly relative to the guide frame 87. An example of a spring for this purpose is the illustrated tension spring 108 (see FIG. 7). Spring 108 is one of a pair of identical tension springs that extend between transverse extensions 107 at opposite sides of an end bracket 106 on the shank 14 and adjustable anchoring bolts 112 at the respective side plates 99 of guide frame 87.

The end bracket 106 has a pair of elongated slots 110 formed through it. Bracket 106 overlies the movable arcuate shank 14. It is longitudinally adjustable relative to the rigid bar by means of a clamping plate 111 and clamping bolts 114 that selectively fix its position along the length of the shank 14.

The lower end of bracket 106 has an upturned section 105. The bracket section 105 is angularly bent to abut against the head of an adjustable bolt 104 when the shank 14 is in its lower or operable seeding position (FIG. 1). Bolt 104 is threadably engaged through the transverse plate 103 across the upper ends of the side plates 99 (see FIGS. 2 and 3).

The bracket 106 and bolt 104 form a shank positioning assembly that includes first and second relatively movable elements normally in abutment with one another for limiting the extent of downward movement of the shank 14 relative to the guide frame 87. One can selectively change the normal planting position of arcuate shank 14 and runner 28 by varying the longitudinal position of bracket 106 along the rear surface 90 of arcuate shank 14. This can be preset by rolling the coulter 34 onto a hard supporting surface. By then placing a block of predetermined height (not shown) under runner 28, one can adjust the position of bracket 106 to locate the bottom edge of runner 28 at the desired planting depth relative to the rims 46 of press wheels 10. Fine adjustment of the planting depth can then be achieved by setting the adjustable bolt 104, which acts as a stop that defines the lower working position of shank 14 and runner 28.

Calibrated markings along the shank 14 can also be used as a visual guide when setting the desired planting depth (see FIG. 16) as an alternative to use of a calibrating block in the manner described in the preceding paragraph.

Springs 108 will keep the runner 28 at its preset elevation and seed will be accurately deposited within the resulting soil slot during normal seeding operations, as illustrated in FIG. 1. However, should a rock or other obstacle be encountered by the front of the narrow runner 28, the runner and supporting shank 14 can move elevationally upward (as shown in FIG. 4) in opposition to the forces of the springs 108. The runner 28 will be returned to its working position after the obstacle has been passed.

Auxiliary guidance of the shank 14 can be provided by a forwardly-projecting shank guide 127 located along its rigid rectangular bar structure. The guide 127 is formed from a solid plate of plastic resin, and is slotted to loosely engage the circular sides of the coulter 34. A second such guide (not shown) can also be located toward the top end of the shank 14. Guidance can be similarly provided by providing a series of staggered plates (not shown) along the shank 14 in lateral engagement with opposite sides of the coulter 34.

Because the guide frame 87 is pivotally mounted about shaft 70 relative to the vehicle frame, it is necessary to provide it with angular stabilization to define its normal working position when seeding. This stabilization function is provided by upper transverse rollers 80 that engage the front surface 89 of the shank 14.

Each roller 80 rotates about a supporting fixed shaft 81 on frame 12. Shaft 81 also supports enlarged tubular spacers 82 which are interspersed with the rollers 80. The spacers 82 abut the side edges of each shank 14 and roller 80. They loosely center the upper end of shank 14 relative to its associated press wheel 10, but do permit a certain degree of transverse movement as required. Shaft 81 can be fixed or adjustably mounted on the vehicle frame 12.

As can be seen in FIGS. 1 and 4, the rearward pressure exerted on the lower end of shank 14 during seeding will urge its front surface 89 against the roller 81 as guide frame 87 pivots slightly about the axis of shaft 70. Because the shank 14 is rigid, the support afforded to it by roller 81 will accurately position the shank in a concentric position relative to the axis of the associated press wheel 10.

Figure 9:
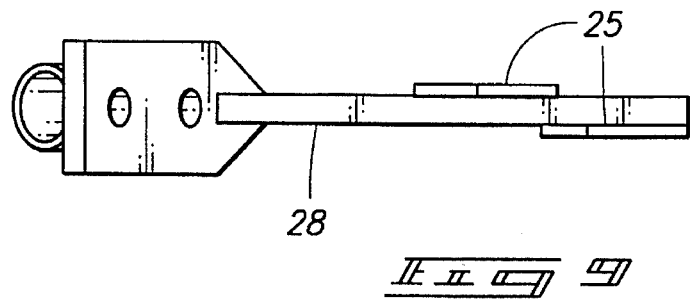
FIG. 9 is a top view of the runner shown in FIG. 8.
Figure 10:
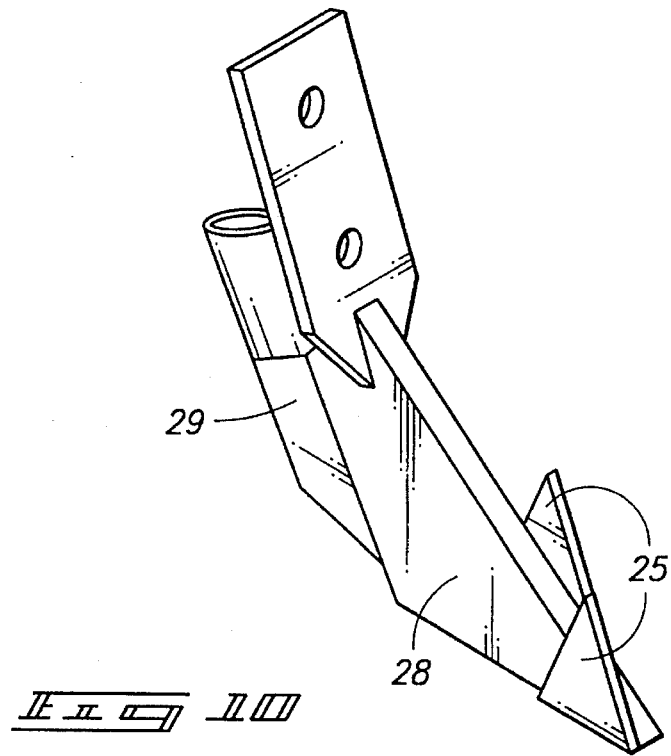
FIG. 10 is a perspective view of the improved runner structure.
Figure 17:
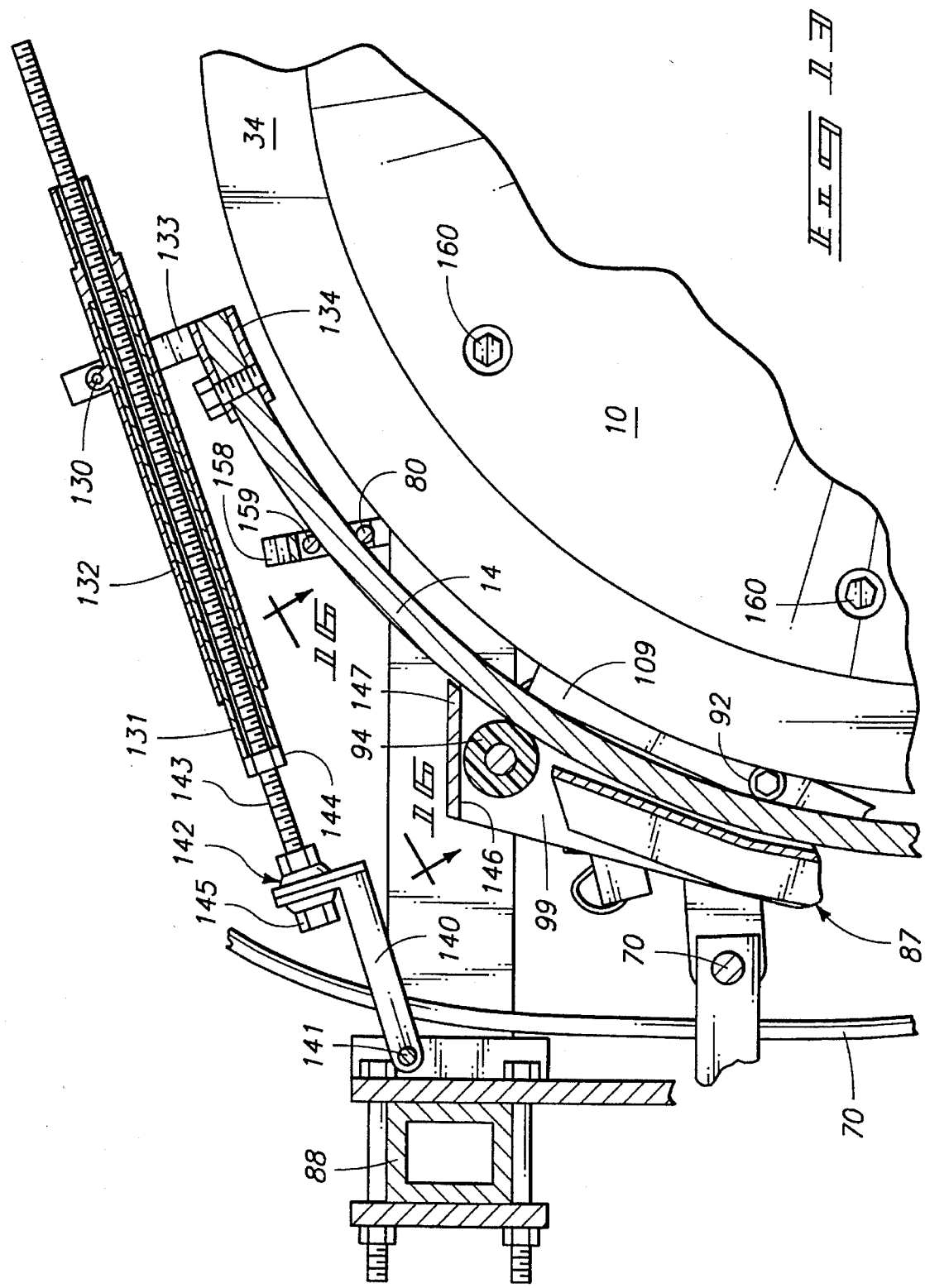
FIG. 17 is a top view of the shovel assembly shown in FIG. 11.
Figure 14:
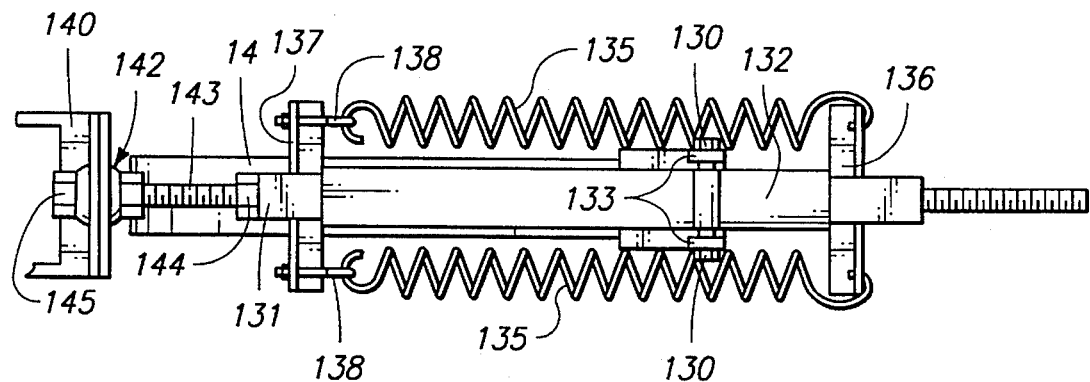
FIG. 14 is a top view of the modification as seen along line 14—14 in FIG. 12.

The critical transverse centering of runner 28 behind and under the coulter 34 can be assured by use of the flanges 25 at the forward point of the runner. As can be seen in FIGS. 8–10, each flange 25 preferably has a triangular shape. The flanges 25 are longitudinally staggered along runner 28 to clear trash and soil engaged between the runner 28 and coulter 34 while maintaining the runner 28 transversely centered. The staggering of flanges 25 overcomes the tendency of such overlapping flanges to clog with soil, which would occur if they were placed side-by-side. The rubbing action of flanges 25 also assists in keeping the outer edges of coulter 34 clear of soil and debris.

A second and preferred embodiment of the seed drill planting assembly is illustrated in FIGS. 11–19. Reference numerals previously used with respect to the first embodiment are repeated in these drawings. Descriptions of the elements common to the first embodiment will of the assembly will not be repeated.

The primary modifications shown in FIGS. 11–16 pertain to the shank positioning assembly that sets the seed planting depth by limiting the extent of available downward movement of the shank 14. This alternative and preferred shank positioning assembly permits adjustment of the normal planting depth without varying the spring tension that urges shank 14 downwardly in the soil during normal planting operations. It also permits adjustment of the normal planting without working against the biasing spring forces required on the shank 14.

Details of the improved shank positioning assembly are best understood with reference to FIGS. 12–14 and 16. It basically includes first and second relatively movable elements normally in abutment with one another.

In the illustrated embodiment, the first element 131 is shown as an elongated tubular member operably connected to the supporting frame through an interconnecting lead screw 143. The second element 132 is shown as a coaxial tubular member surrounding the first element 131 and the coaxial lead screw 143. The second element 132 is operably connected to shank 14 by a yoke 133 pivotally connected to it about a transverse axis at 130. The lower end of yoke 133 includes a clamp 134 fixed to the upper end of shank 14.

The interior of the second tubular element 132 includes an inwardly projecting shoulder that is normally in abutment with the outer end of the first tubular element 131. This abutting engagement of tubular elements 131 and 132 limits the extent of downward movement of the shank 14 at a preset planting position.

The first and second tubular elements 131, 132 form a telescoping assembly interconnected by at least one spring. In the illustrated form of the equipment, two tension springs 135 are positioned at opposite sides of the telescoping assembly. They extend between an upper transverse bar 136 on the second tubular element 132 and a lower transverse bar 137 on the first tubular element 131. The lower end of each spring 135 is adjustably connected to the transverse bar 137 by an interposed adjustment bolt 138. The tension applied to shank 14 by the springs 135 can be selectively adjusted by manipulation of the respective bolts 138.

Lead screw 143 threadably engages a nut 144 fixed to the lower or inner end of the first tubular element 131. The tubular elements 131,132, which are preferably square and non-rotatable relative to one another, therefore travel along the axis of lead screw 143 in response to its rotation.

The lower or inner end of lead screw 143 is freely rotatable on a supporting mounting yoke 140 pivotally connected to the supporting frame of the seed drill by a transverse pivot shaft 141. The interconnection between yoke 140 and lead screw 143 is in the form of a conventional spherical joint that accommodates both rotational and angular relative movement between these elements.

An adjustment nut 145 is fixed to the inner end of lead screw 143. By manually turning adjustment nut 145, one can vary the position of the abutting first and second tubular elements 131, 132 to preset a desired planting depth for the seed drill.

Figure 16:
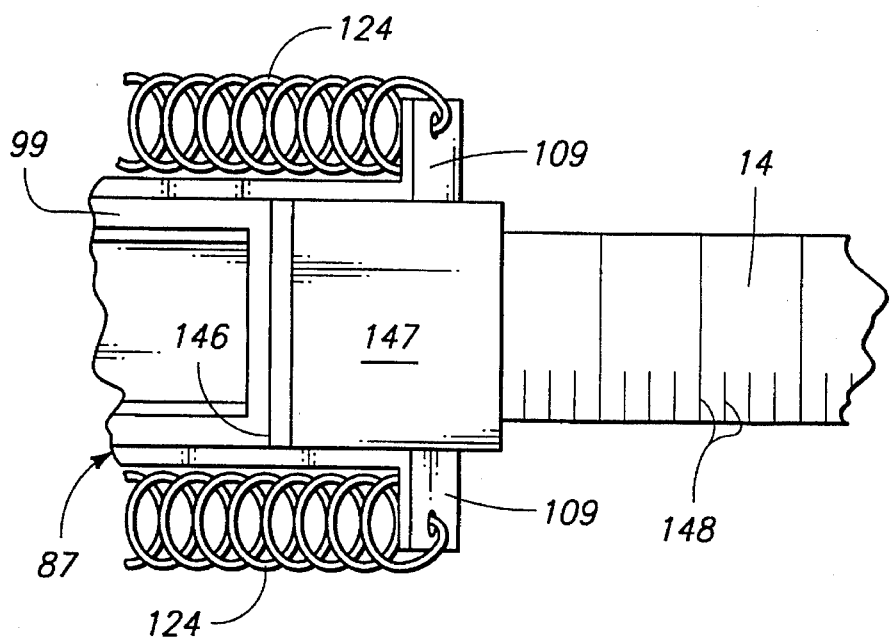
FIG. 16 is a fragmentary view of the shank as seen along line 16—16 in FIG. 13.
Figure 17:
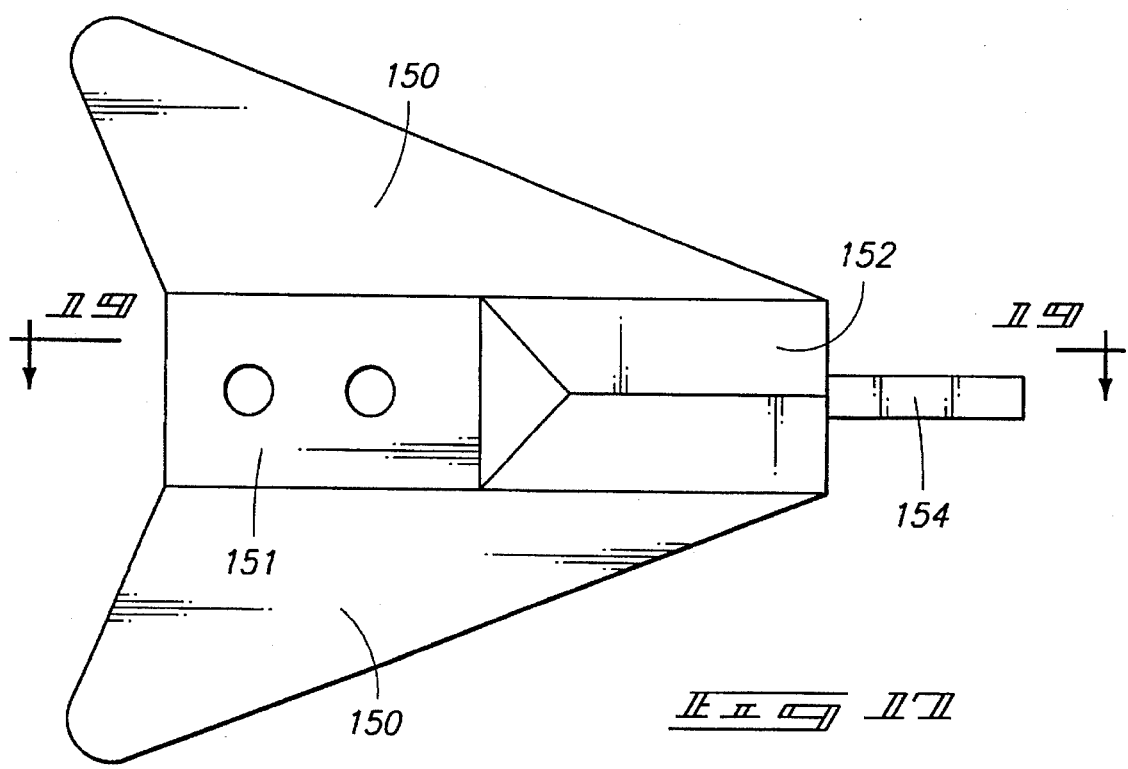

As mentioned previously, visual indicators can be imprinted along the shank 14 as a guide for determining its planting depth. FIG. 16 shows the addition of calibrated dimensional markings across the rear arcuate surface 90 of shank 14. These visual markings can be read in relation to an intersecting transverse plate 147 provided across the upper edges 146 of the side plates 99 along guide frame 87. By observing the position of shank 14 relative to guide frame 87 as the adjustment bolt 138 is turned, one can very accurately preset a desired planting depth for the seed drill.

Figure 15:
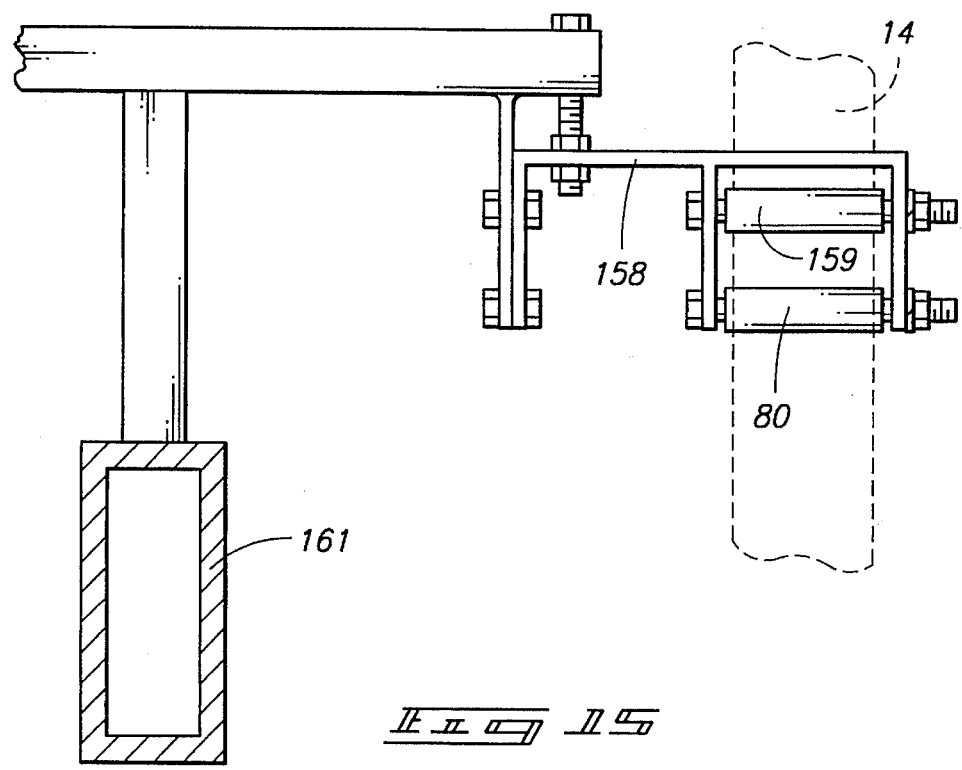
FIG. 15 is a fragmentary sectional view taken along line 15—15 in FIG. 12.

FIG. 15 shows details of the previously-described roller 80 that engages the front surface 89 of the shank 14. As shown, roller 80 is mounted on an adjustable transverse supporting frame 158 and is loosely opposed by a spaced transverse roller 159. Frame 158 is rigidly connected to a longitudinal beam 161 that forms part of the supporting frame for the seed drill.

FIGS. 11 and 17–19 also illustrate an improved furrow-opening shovel 18 specifically designed to facilitate placement of fertilizer beneath the planted seeds 32. To this end, the shovel includes triangular wings 150 leading upwardly and to the side to open a furrow of a desired cross-sectional profile. The central face 151 of the shovel is provided with a lower deflector 152 for moving soil across the wings 150 in response to forward shovel motion.

A vertical blade 154 is provided along the rear surfaces of the shovel to open the extended slot 21. It is movably supported by brackets 153 fixed to the shovel. Blade 154 includes a series of transverse apertures 155 for adjustably bolting it to the brackets 153 at a desired slotting depth.

A fertilizer tube 156 extends from a source of fertilizer (not shown) on the seed drill to a lower tube end 157 fixed at the rear edge of blade 154. Liquid fertilizer or other forms of fertilizer can therefore be discharged from the lower tube end 157 at the preset depth along the lower edge of blade 154. This fertilizer will be covered by the subsequent rolling action of press wheels 10, and will be maintained at an accurate depth under the planting depth of the seeds 32.

The drawings depict the elements of the invention in the preferred forms recognized at the time this embodiment of the invention was designed. Alternative forms of these elements can be substituted as substantial replacements dictated by particular machine requirements.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A seed drill planting assembly comprising:

a press wheel assembly rotatably mounted about a horizontal transverse axis for rolling soil engagement while moving in a forward direction along a field;

an arcuate shank located in a transversely centered upright position behind the press wheel assembly;

a narrow longitudinal runner mounted to a lower end of the shank and extending rearwardly from beneath the press wheel assembly;

a guide frame in engagement with the shank for permitting movement of the shank and runner along an upright arcuate path substantially centered about the transverse axis of the press wheel assembly;

a shaft pivotally connecting the guide frame to a supporting frame for motion about a horizontal transverse axis; and seed delivery means on the runner for depositing seeds immediately behind the runner.

2. The seed drill planting assembly of claim 1, wherein the shaft permits limited free transverse motion of the guide frame relative to the supporting frame along a transverse shaft axis.

3. The seed drill planting assembly of claim 1, wherein the guide frame includes at least three rollers spaced along the shank with alternate rollers respectively engaging opposed front and rear surfaces of the shank to define the arcuate path of the shank and runner.

4. The seed drill planting assembly of claim 1, wherein the guide frame includes at least three rollers spaced along the shank with alternate rollers respectively engaging opposed front and rear surfaces of the shank to define the arcuate path of the shank and runner;

at least one of the rollers being movably supported relative to the guide frame.

5. The seed drill planting assembly of claim 1, wherein the guide frame includes at least three rollers spaced along the shank with alternate rollers respectively engaging opposed front and rear surfaces of the shank to define the arcuate path of the shank and runner;

at least one of the rollers being movably supported relative to the remaining rollers for motion toward or away from the arcuate path of the shank relative to the guide frame; and a spring operably connecting the one roller to the guide frame for yieldably urging the one roller toward the arcuate path of the shank relative to the guide frame.

6. The seed drill planting assembly of claim 1 wherein the shank includes an arcuate front surface facing the press wheel assembly, the seed drill further comprising:

a transverse roller support mounted to the frame in rolling engagement with the arcuate front surface of the shank.

7. The seed drill planting assembly of claim 1, wherein the guide frame comprises:

three rollers spaced along the shank with alternate rollers respectively in opposed engagement against opposed front and rear surfaces of the shank;

the outermost two of the rollers being in engagement with the rear surface of the shank;

a center roller being in engagement with the front surface of the shank and being movably supported on the guide frame relative to the remaining rollers; and a spring operably connected to the center roller to yieldably urge the center roller against the front surface of the shank.

8. The seed drill planting assembly of claim 1, further comprising:

at least one spring operably connected to the shank for yieldably urging it downwardly relative to the guide frame.

9. The seed drill planting assembly of claim 1, further comprising:

at least one spring operably connected to the shank for yieldably urging it downwardly relative to the guide frame; and a shank positioning assembly for limiting the extent of downward movement of the shank at a preset planting position.

10. The seed drill planting assembly of claim 1, further comprising:

a shank positioning assembly including first and second relatively movable elements normally in abutment with one another for limiting the extent of downward movement of the shank at a preset planting position; and at least one spring operably connected to the shank positioning assembly for yieldably urging the shank in a downward direction relative to the guide frame.

11. The seed drill planting assembly of claim 1, further comprising:

a shank positioning assembly including first and second relatively movable elements normally in abutment with one another, the first element being operably connected to the supporting frame and the second element being operably connected to the shank;

at least one spring operably connected between the first and second relatively movable elements of the shank positioning assembly for normally maintaining the first and second elements of the shank positioning assembly in abutment by yieldably urging the shank in a downward direction relative to the supporting frame; and a longitudinally extensible member mounting the first element of the shank positioning assembly to the supporting frame for selectively adjusting the limit of downward movement of the shank relative to the guide frame without modifying the operable connection between the spring and the first and second elements of the shank positioning assembly.

12. The seed drill planting assembly of claim 1, further comprising:

a telescoping assembly having first and second relatively movable tubular elements normally in abutment with one another;

the first tubular element being operably connected to the supporting frame by a lead screw coaxially extending through the first element, the lead screw being rotatably anchored to the supporting frame and threadably interconnected to the first element for selectively adjusting the limit of downward movement of the shank relative to the guide frame;

the second element coaxially surrounding the first element and being operably connected to the shank; and at least one spring operably connected between the first and second elements of the telescoping assembly for normally maintaining the first and second elements of the shank positioning assembly in abutment by yieldably urging the shank in a downward direction relative to the supporting frame;

whereby the location of the first element relative to the supporting frame can be adjusted by rotation of the lead screw without modifying the operable connection between the spring and the first and second elements of the telescoping assembly.

13. A seed drill planting assembly comprising:

a press wheel assembly rotatably mounted about a horizontal transverse wheel axis for rolling soil engagement in a forward direction along a field, the press wheel assembly including a coulter having a circular periphery centered about the wheel axis;

a shank located behind the press wheel assembly in an upright position, the shank including an arcuate front surface located adjacent to the circular periphery of the coulter;

a narrow longitudinal runner arranged in an upright position and fixed to a lower end of the shank, the runner extending rearwardly from beneath the press wheel assembly in longitudinal alignment with the coulter;

a guide frame overlapping a portion of the arcuate shank;

a shaft pivotally connecting the guide frame to a supporting frame for motion about a horizontal transverse axis;

a plurality of guiding elements mounted on the guide frame and engaging the shank; and seed delivery means on the runner for depositing seeds at a location immediately behind the runner.

14. The seed drill planting assembly of claim 13 wherein the shaft permits limited free transverse motion of the guide frame relative to the supporting frame along a transverse shaft axis.

15. The seed drill planting assembly of claim 13, further comprising:

protruding flanges in operable engagement with opposed sides of the coulter, the flanges being staggered along the runner to clear trash and soil engaged between the runner and coulter while maintaining the runner transversely centered in longitudinal alignment behind the coulter and permitting movement of the shank relative to the guide frame along an upright arcuate path substantially centered about the wheel axis.

16. The seed drill planting assembly of claim 13 wherein the guiding elements include at least three rollers spaced along the guide frame with alternate rollers respectively engaging the arcuate front surface of the shank and an opposed concentric rear surface for defining the arcuate path of the shank relative to the guide frame.

17. The seed drill planting assembly of claim 13 wherein the guiding elements include at least three rollers spaced along the guide frame with alternate rollers respectively engaging the arcuate front surface of the shank and an opposed concentric rear surface for defining the arcuate path of the shank relative to the guide frame;

at least one of the rollers being movably supported on the guide frame for manual movement toward or away from the wheel axis.

18. The seed drill planting assembly of claim 13 wherein the guiding elements include at least three rollers spaced along the guide frame with alternate rollers respectively engaging the arcuate front surface of the shank and an opposed concentric rear surface for defining the arcuate path of the shank relative to the guide frame;

at least one of the rollers being movably supported on the guide frame for motion toward or away from the wheel axis; and a spring operably connecting the one roller to the guide frame for yieldably urging the one roller toward the arcuate path of the shank relative to the guide frame.

19. The seed drill planting assembly of claim 13 wherein the guiding elements include three rollers spaced along the guide frame with alternate rollers respectively engaging the arcuate front surface of the shank and an opposed concentric rear surface for defining the arcuate path of the shank relative to the guide frame;

one of the rollers being movably supported on the guide frame for motion toward or away from the wheel axis; and the remaining two rollers being supported on the guide frame for rotation about axes which are fixed to the guide frame and are located at opposite sides of the one roller of the guide frame.

20. The seed drill planting assembly of claim 13, further comprising:

at least one spring operably connected to the shank for yieldably urging it in a downward direction relative to the guide frame.

21. The seed drill planting assembly of claim 13, further comprising:

a shank positioning assembly including first and second relatively movable elements normally in abutment with one another for limiting the extent of downward movement of the shank at a preset planting position.

22. The seed drill planting assembly of claim 13, further comprising:

a shank positioning assembly including first and second relatively movable elements normally in abutment with one another for limiting the extent of downward movement of the shank at a preset planting position; and at least one spring operably connected to the shank positioning assembly for yieldably urging the shank in a downward direction relative to the guide frame.

23. The seed drill planting assembly of claim 13, further comprising:

a shank positioning assembly including first and second relatively movable elements normally in abutment with one another, the first element being operably connected to the supporting frame and the second element being operably connected to the shank;

at least one spring operably connected between the first and second relatively movable elements of the shank positioning assembly for normally maintaining the first and second elements of the shank positioning assembly in abutment by yieldably urging the shank in a downward direction relative to the supporting frame; and a longitudinally extensible member mounting the first element of the shank positioning assembly to the supporting frame for selectively adjusting the limit of downward movement of the shank relative to the guide frame without modifying the operable connection between the spring and the first and second elements of the shank positioning assembly.

24. The seed drill planting assembly of claim 13, further comprising:

a telescoping assembly having first and second relatively movable tubular elements normally in abutment with one another;

the first tubular element being operably connected to the supporting frame by a lead screw coaxially extending through the first element, the lead screw being rotatably anchored to the supporting frame and threadably interconnected to the first element for selectively adjusting the limit of downward movement of the shank relative to the guide frame;

the second element coaxially surrounding the first element and being operably connected to the shank; and at least one spring operably connected between the first and second elements of the telescoping assembly for normally maintaining the first and second elements of the shank positioning assembly in abutment by yieldably urging the shank in a downward direction relative to the supporting frame;

whereby the location of the first element relative to the supporting frame can be adjusted by rotation of the lead screw without modifying the operable connection between the spring and the first and second elements of the telescoping assembly.

25. The seed drill planting assembly of claim 13, further comprising:

a transverse roller support mounted to the supporting frame in rolling engagement against the arcuate surface of the shank.

26. A seed drill planting assembly comprising:

a supporting frame;

a press wheel assembly rotatably mounted on the supporting frame about a horizontal transverse wheel axis for rolling soil engagement in a forward direction along a field, the press wheel assembly including a coulter having a circular periphery centered about the wheel axis;

an arcuate shank movably mounted on the supporting frame at a location in an upright position rearwardly adjacent to the circular periphery of the coulter;

a narrow longitudinal runner arranged in an upright position and mounted to a lower end of the arcuate shank, the runner extending rearwardly from beneath the press wheel assembly in longitudinal alignment with the coulter;

a shank positioning assembly including first and second relatively movable elements normally in abutment with one another, the first element being operably connected to the supporting frame and the second element being operably connected to the shank;

at least one spring operably connected between the first and second relatively movable elements of the telescoping assembly for normally maintaining the first and second elements of the shank positioning assembly in abutment by yieldably urging the shank in a downward direction relative to the supporting frame; and a longitudinally extensible member mounting the first element of the shank positioning assembly to the supporting frame for selectively adjusting the limit of downward movement of the shank relative to the guide frame without modifying the operable connection between the spring and the first and second elements of the shank positioning assembly; and a seed delivery tube on the runner for depositing seeds at a location immediately behind the runner.

27. The seed drill planting assembly of claim 26, wherein the first and second elements of the shank positioning assembly are tubular components of a telescoping assembly;

the first tubular element being operably connected to the supporting frame by a lead screw coaxially extending through the first element, the lead screw being rotatably anchored to the supporting frame and threadably interconnected to the first element for selectively adjusting the limit of downward movement of the shank relative to the guide frame.

28. The seed drill planting assembly of claim 26, wherein the first and second elements of the shank positioning assembly are tubular components of a telescoping assembly;

the first tubular element being operably connected to the supporting frame by a lead screw coaxially extending through the first element, the lead screw being rotatably anchored to the supporting frame and threadably interconnected to the first element for selectively adjusting the limit of downward movement of the shank relative to the guide frame;

the second tubular element coaxially surrounding the first tubular element and being operably connected to the shank.

29. A seed drill planting assembly comprising:

a supporting frame;

a press wheel assembly rotatably mounted on the supporting frame about a horizontal transverse wheel axis for rolling soil engagement in a forward direction along a field, the press wheel assembly including a coulter having a circular periphery centered about the wheel axis;

a shank located behind the press wheel assembly in an upright position, the shank including an arcuate front surface located adjacent to the circular periphery of the coulter;

a narrow longitudinal runner arranged in an upright position and fixed to a lower end of the shank, the runner being movably mounted relative to the supporting frame and extending rearwardly from beneath the press wheel assembly in longitudinal alignment with the coulter;

a transverse roller support mounted to the supporting frame in rolling engagement against the arcuate front surface of the shank; and a seed delivery tube on the runner for depositing seeds at a location immediately behind the runner.

30. The seed drill planting assembly of claim 29, further comprising:

a guide frame mounted to the supporting frame and overlapping a portion of the arcuate shank; and a plurality of guide rollers on the guide frame in engagement with the shank.

31. A seed drill planting assembly comprising:

a supporting frame;

a press wheel assembly rotatably mounted on the frame about a transverse press wheel axis for rolling ground engagement;

a circumferential coulter rotatable about the transverse press wheel axis in unison with the press wheel assembly;

an arcuate shank movably mounted on the supporting frame at a location in an upright position rearwardly adjacent to the circular periphery of the coulter;

a runner located at the lower end of the shank in longitudinal alignment with the coulter, the runner having protruding flanges in operable engagement with opposed sides of the coulter, the flanges being staggered along the runner to clear trash and soil engaged between the runner and coulter while maintaining the runner transversely centered in longitudinal alignment behind the coulter and permitting movement of the shank relative to the guide frame along an upright arcuate path substantially centered about the wheel axis.

32. A seed drill planting assembly comprising:

a supporting frame;

a press wheel assembly rotatably mounted on the frame about a transverse press wheel axis for rolling ground engagement;

a circumferential coulter rotatable about the transverse press wheel axis in unison with the press wheel assembly;

an arcuate shank movably mounted on the supporting frame at a location in an upright position rearwardly adjacent to the circular periphery of the coulter;

a runner located at the lower end of the shank in longitudinal alignment with the coulter;

a furrow-opening shovel mounted on the support frame at a location forward of the press wheel assembly; and a vertical blade protruding downwardly from the shovel, the blade being movably mounted on the shovel for elevational adjustment relative to it.

* * * * *